United States Patent
Kikuchi

(10) Patent No.: US 10,616,688 B2
(45) Date of Patent: Apr. 7, 2020

(54) SPEAKER BOX AND PROJECTION DEVICE

(71) Applicant: CASIO COMPUTER CO., LTD., Tokyo (JP)

(72) Inventor: Ryo Kikuchi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/884,091

(22) Filed: Jan. 30, 2018

(65) Prior Publication Data

US 2018/0234770 A1  Aug. 16, 2018

(30) Foreign Application Priority Data

Feb. 15, 2017 (JP) ................................. 2017-026292

(51) Int. Cl.
| | |
|---|---|
| *H04R 9/02* | (2006.01) |
| *H04N 9/31* | (2006.01) |
| *H04R 1/02* | (2006.01) |
| *G03B 21/16* | (2006.01) |
| *G03B 31/00* | (2006.01) |

(52) U.S. Cl.
CPC ............. *H04R 9/022* (2013.01); *G03B 21/16* (2013.01); *G03B 31/00* (2013.01); *H04N 9/3144* (2013.01); *H04R 1/028* (2013.01); *H04R 1/025* (2013.01)

(58) Field of Classification Search
None
See application file for complete search history.

(56) References Cited

U.S. PATENT DOCUMENTS

| | | | | |
|---|---|---|---|---|
| 3,722,616 A | * | 3/1973 | Beavers | H04R 1/347 181/155 |
| 4,593,784 A | * | 6/1986 | Flanders | H04R 1/345 181/144 |
| 4,811,403 A | * | 3/1989 | Henricksen | H04R 1/02 181/152 |
| 7,677,354 B2 | | 3/2010 | Osada et al. | |
| 8,042,647 B1 | * | 10/2011 | Layton, Jr. | H04R 1/26 181/152 |
| 8,107,662 B2 | * | 1/2012 | Parker | H04R 9/022 381/164 |

(Continued)

FOREIGN PATENT DOCUMENTS

| | | |
|---|---|---|
| CN | 104216340 A | 12/2014 |
| CN | 205017575 U | 2/2016 |

(Continued)

OTHER PUBLICATIONS

JPO; Japanese Application No. 2017-026292; Notification of Reasons for Refusal dated Nov. 30, 2018.

(Continued)

*Primary Examiner* — Paul W Huber
(74) *Attorney, Agent, or Firm* — Fitch, Even, Tabin & Flannery LLP

(57) ABSTRACT

A speaker box for accommodating a speaker, including an outlet port provided avoiding an area corresponding to a center portion of the speaker, in a first side surface section of the speaker box which is parallel to a center axis of the speaker, and an inlet port provided avoiding an area corresponding to the center portion of the speaker, in a second side surface section of the speaker box which is opposed to the first side surface section via the speaker.

20 Claims, 13 Drawing Sheets

(56) References Cited

U.S. PATENT DOCUMENTS

| | | | |
|---|---|---|---|
| 8,428,284 B2* | 4/2013 | Meyer | H04R 1/347 181/155 |
| 8,561,756 B2* | 10/2013 | Litovsky | H04R 1/02 181/198 |
| 2005/0211498 A1 | 9/2005 | Osada et al. | |
| 2007/0258612 A1* | 11/2007 | Mamin | H04R 1/2819 381/338 |
| 2008/0169151 A1* | 7/2008 | Barrios | H04R 1/2819 181/156 |
| 2013/0213730 A1 | 8/2013 | Litovsky et al. | |
| 2013/0242207 A1* | 9/2013 | Hiramatsu | H04N 5/7475 348/789 |

FOREIGN PATENT DOCUMENTS

| | | |
|---|---|---|
| CN | 106303774 A | 1/2017 |
| JP | 2005-277502 A | 10/2005 |
| JP | 2006-033100 A | 2/2006 |
| JP | 2016-51868 A | 4/2016 |

OTHER PUBLICATIONS

SIPO; Application No. 201810146887.3; First Chinese Office Action dated Mar. 28, 2019.

JPO; Application No. 2017-026292; Notification of Reasons for Refusal dated Jun. 17, 2019.

* cited by examiner

SPEAKER BOX AND PROJECTION DEVICE

CROSS-REFERENCE TO RELATED APPLICATION

This application is based upon and claims the benefit of priority from the prior Japanese Patent Application No. 2017-026292, filed Feb. 15, 2017, the entire contents of which are incorporated herein by reference.

BACKGROUND OF THE INVENTION

1. Field of the Invention

The present invention relates to a speaker box for use in an electronic device such as a projection device equipped with a speaker, and a projection device equipped with the speaker box.

2. Description of the Related Art

For example, a projection device is known which has accommodated in its exterior case a projection section which projects images such as video, a speaker section which emits sounds such as voice, and a cooling section which cools the inside of the exterior case, as described in Japanese Patent Application Laid-Open (Kokai) Publication No. 2016-051868.

The speaker section of this projection device includes a speaker and a speaker box, and the speaker box has been attached to the inside of the exterior case with the speaker being accommodated in the speaker box. Here, the speaker box is formed to have a box shape whose front surface is open, and the speaker is accommodated from this open front surface with its front surface being exposed.

Accordingly, this speaker section of the projection device has a problem in that, since the speaker has been surrounded by the speaker box except for its front surface, heat is prone to be trapped in the speaker box, which disadvantageously increases the temperature in the speaker box.

In order to solve this problem, a method has been conceived in which a hole is provided in the speaker box. However, merely providing a hole in the speaker box does not sufficiently cool the inside of the speaker box. On the contrary, it raises another problem in that a sound pressure in the speaker box is decreased and whereby a sound is not favorably emitted.

An object of the present invention is to provide a speaker box capable of suppressing an increase in temperature inside a speaker box while maintaining a sound pressure so as to favorably emit a sound, and a projection device having the the speaker box.

SUMMARY OF THE INVENTION

In accordance with one aspect of the present invention, there is provided a speaker box for accommodating a speaker, comprising: an outlet port provided avoiding an area corresponding to a center portion of the speaker, in a first side surface section of the speaker box which is parallel to a center axis of the speaker; and an inlet port provided avoiding an area corresponding to the center portion of the speaker, in a second side surface section of the speaker box which is opposed to the first side surface section via the speaker.

In accordance with another aspect of the present invention, there is provided a projection device comprising: the above-described speaker box; and a projection section which projects an image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS (First Embodiment)

A first embodiment of the projection device to which the present invention has been applied is described with reference to FIG. 1 to FIG. 4B.

Figure 1:
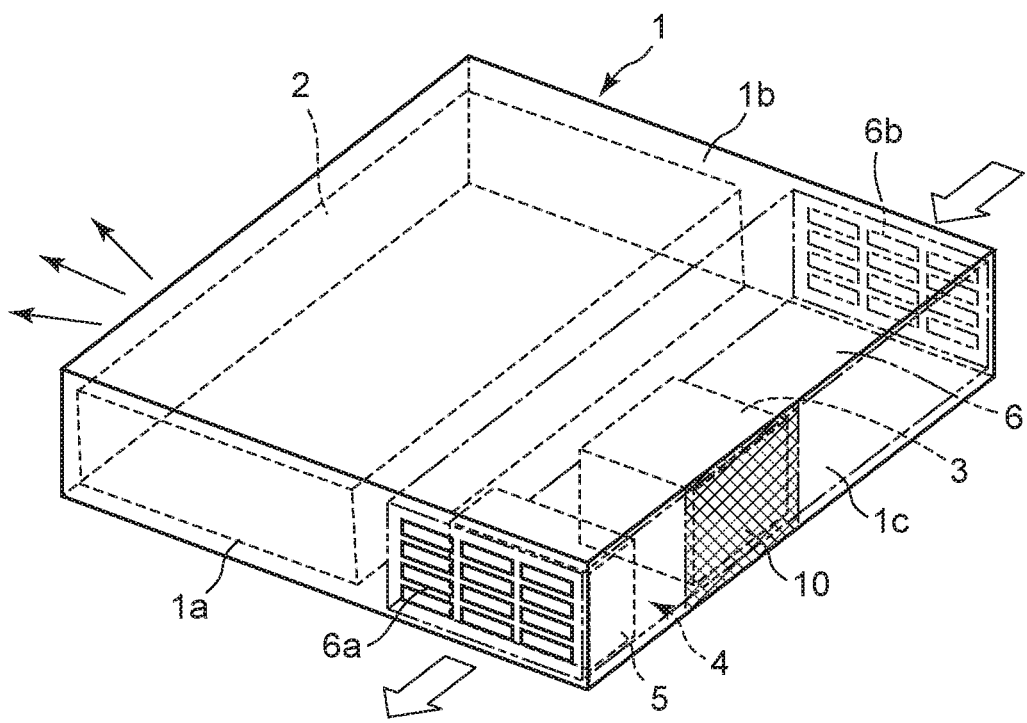
FIG. 1 is a perspective view of a first embodiment where the present invention has been applied in a projection device.

This projection device includes an exterior case 1 formed in a box shape, as shown in FIG. 1. This exterior case 1 has accommodated therein a projection section 2 which projects images such as video, a speaker section 3 which emits sounds such as voice, and a cooling section 4 which cools this speaker section 3.

This projection device is structured such that, when the exterior case 1 is arranged on a table (not shown), the projection section 2 projects images onto a screen (not shown) arranged in front (left side in FIG. 1) of the exterior case 1, as shown in FIG. 1. The user is positioned on the back surface side (right side in FIG. 1) of the exterior case 1 which is the opposite side of the screen across this exterior case 1, and the speaker section 3 emits sounds such as voice toward the user side.

That is, the projection section 2 is structured to be arranged on the front surface side (left side in FIG. 1) inside the exterior case 1 and project images onto a screen (not shown) located in front of the exterior case 1, as shown in FIG. 1. The speaker section 3 is structured to be arranged substantially at the middle of the back surface side (right side in FIG. 1) inside the exterior case 1 which is the opposite side of the projection section 2 and emit sounds such as voice toward the user positioned in the back surface direction of the exterior case 1.

The cooling section 4 includes a cooling fan 5 and a flow path section 6, as shown in FIG. 1. The cooling fan 5 is structured to be arranged on the back surface side inside the exterior case 1 which is the opposite side of the projection section 2 and positioned next to and in front of the speaker section 3 so as to take air from the outside of the exterior case 1 into the inside of the exterior case 1.

The flow path section 6 is provided between a first side section 1*a* on a side portion of the exterior case 1 on the cooling fan 5 side and a second side section 1*b* on a side portion of the exterior case 1 on the opposite side, as shown in FIG. 1. That is, inside this flow path section 6, the cooling fan 5 and the speaker section 3 are arranged next to each other.

Here, the first side section 1*a* on the exterior case 1 is provided with an outlet port 6*a* opposing the flow path section 6, as shown in FIG. 1. This outlet port 6*a* is formed of a plurality of slit holes. Also, the second side section 1*b* on the exterior case 1 is provided with an inlet port 6*b* opposing the flow path section 6. As with the outlet port 6*a*, this inlet port 6*b* is formed of a plurality of slit holes. In this structure, the cooling section 4 is structured to take air outside the exterior case 1 by the cooling fan 5 from the inlet port 6*b* of the second side portion 6*b* of the exterior case 1 to the inside of the flow path section 6 in the exterior case 1, guide this taken air to the speaker section 3 via the flow path section 6, cool the speaker section 3 with this guided air, and releases this cooling air from the outlet port 6*a* of the first side section 1*a* of the exterior case 1 to the outside, as shown in FIG. 1.

The speaker section 3 includes a speaker 7 and a speaker box 8, as shown in FIG. 2 to FIG. 4B. The speaker 7 includes an electromagnet 7*a*, a diaphragm 7*b*, and a cone 7*c*, which are structured to be attached to the inside of the speaker box 8 via a frame 9, as shown in FIG. 3B. The speaker box 8 is formed in a substantially quadrangular box shape whose front side surface is open to expose the front surface (right side surface in FIG. 2) of the cone 7*c* of the speaker 7 to the outside.

As a result, the speaker box 8 is structured such that the speaker 7 is inserted from the front surface side of the speaker box 8 and arranged on the inside, and the frame 9 is attached to an inner portion of the speaker box 8 on the front surface side by screws 9 with the cone 7*c* of the speaker 7 being externally exposed, whereby the speaker 7 is attached to the inside of the speaker box 8, as shown in FIG. 2 to FIG. 4B.

Also, this speaker box 8 is arranged and attached to the inside of the exterior case 1 by screws with the front surface of the speaker box 8, in which the cone 7*c* of the speaker 7 is positioned, being opposed to a third side section 1*c* on the back surface side of the exterior case 1 which is the opposite side of the projection section 2, as shown in FIG. 1.

Here, the third side section 1*c* on the back surface side of the exterior case 1 has an opening (not shown) opposed to the open front surface of the speaker box 8, and this opening is provided with a speaker net 10, as shown in FIG. 1. As a result, the speaker 7 is structured such that sounds such as voice are emitted from the third side section 1*c* on the back surface side of the exterior case 1 to the outside through the speaker net 10.

Also, this speaker box 8 has a first vent 11 which is an outlet port provided in a first side surface section 8*a* (side surface on the front side in FIG. 2) in parallel with the center axis S of the speaker 7 and positioned avoiding an area corresponding to a center portion G of the speaker 7, and a second vent 12 which is an inlet port provided in a second side surface section 8*b* (side surface on the rear side in FIG. 2) opposing the first side surface section 8*a* via the speaker 7 and positioned avoiding an area corresponding to the center portion G of the speaker 7, as shown in FIG. 2 to FIG. 4B. Here, the position of the center portion G of the speaker 7 coincides with a point of intersection of the diaphragm. 7*b* of the speaker 7 and the center axis S of the speaker 7.

Figure 4A:
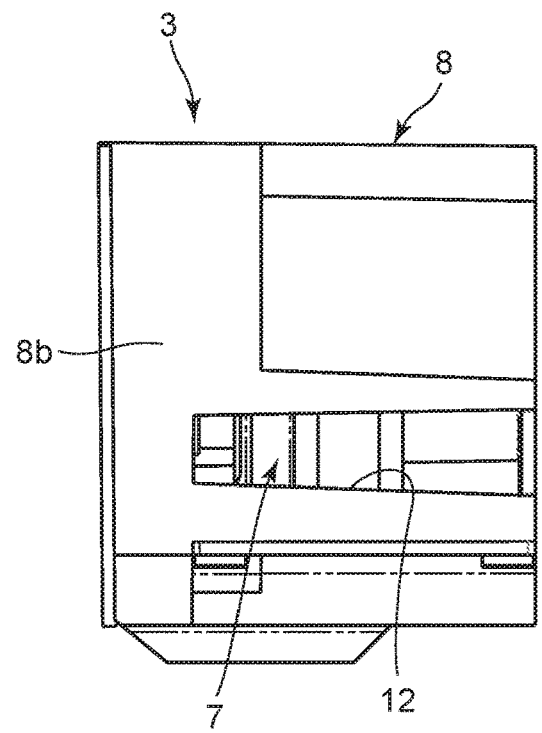
FIG. 4A is a right side view of the speaker section shown in FIG. 2.
Figure 4B:
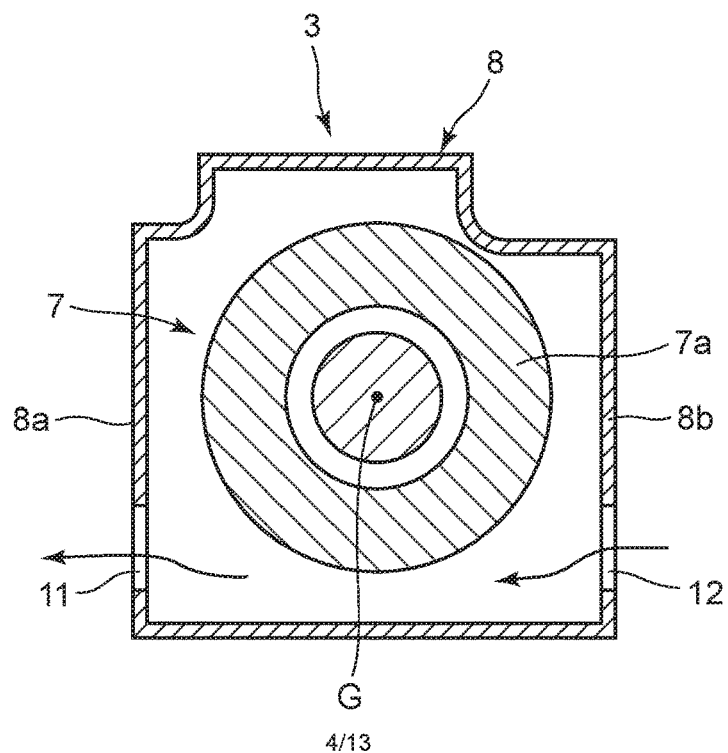
FIG. 4B is a sectional view of the speaker section taken along line B-B in FIG. 3B.

In this embodiment, the speaker box 8 is arranged inside the exterior case 1 with the first side surface section 8*a* being adjacent to the cooling fan 5 and the second side surface section 8*b* being positioned opposite to the cooling fan 5, as shown in FIG. 1. The first vent 11 provided in the first side surface section 8*a* and the second vent 12 provided in the second side surface section 8*b* are opposed to each other via the speaker 7, as shown in FIG. 4B.

Figure 2:
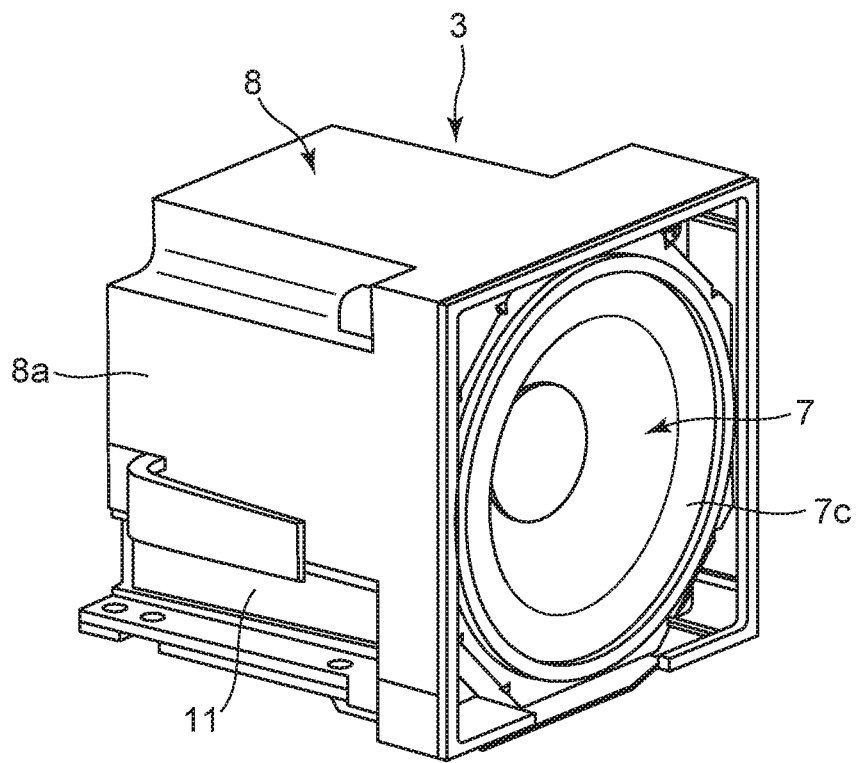
FIG. 2 is an enlarged perspective view of a speaker section shown in FIG. 1.

Here, the first vent 11 is provided in the first side surface section 8*a* in a manner to avoid an area corresponding to the center portion G of the speaker 7. In other words, it is provided in a lower side area located lower than the center portion G of the speaker 7, as shown in FIG. 2 and FIG. 4B. That is, this first vent 11 is provided at a position where sound leakage due to the sound directivity of the speaker 7, that is, concentric sound directivity centering on the center axis S of the speaker 7 is decreased.

Figure 3A:
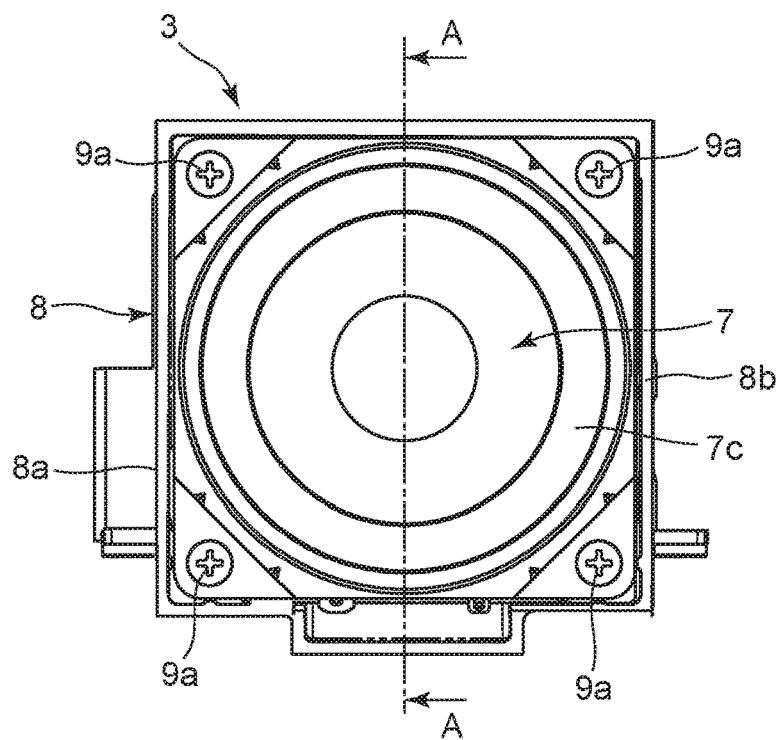
FIG. 3A is a front view of the speaker section shown in FIG. 2.
Figure 3B:
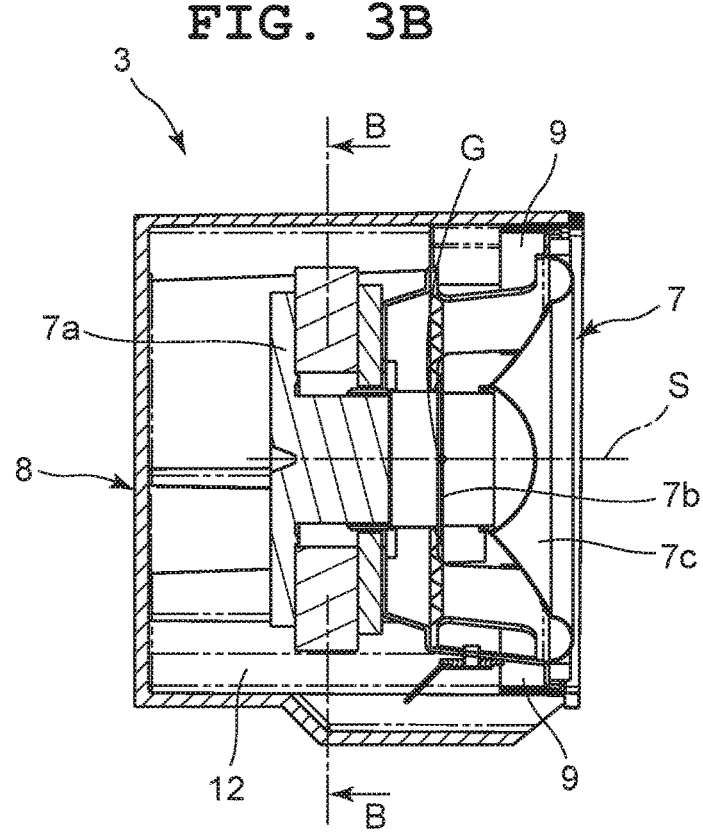
FIG. 3B is a sectional view of the speaker section taken along line A-A in FIG. 3A.

Also, the second vent 12 is provided in the second side surface section 8*b* in a manner to avoid an area corresponding to the center portion G of the speaker 7. In other words, it is provided in a lower side area located lower than the center portion G of the speaker 7, as shown in FIG. 3B, FIG. 4A, and FIG. 4B. That is, this second vent 12 is provided at a position where sound leakage due to the sound directivity of the speaker 7, that is, concentric sound directivity centering on the center axis S of the speaker 7 is decreased. As a result, the first vent 11 and the second vent 12 are provided at positions opposing each other.

Also, the first vent 11 and the second vent 12 are each formed in a slit shape elongated in a lateral direction parallel to the center axis S of the speaker 7, as shown in FIG. 2 to FIG. 4B. These first and second vents 11 and 12 have a substantially same size and are provided opposing each other via the speaker 7.

That is, the first vent 11 and the second vent 12 are each formed such that its length in the lateral direction parallel to the center axis S of the speaker 7 is sufficiently longer than its length in the vertical direction orthogonal to the center axis S of the speaker 7, as shown in FIG. 2 to FIG. 4B. As a result, these first and second vents 11 and 12 are formed to have a size by which a decrease in the sound pressure of the speaker 7 inside the speaker box 8 can be prevented and ventilation inside the speaker box 8 can be ensured so as to suppress an increase in temperature inside the speaker box 8.

Figure 5:
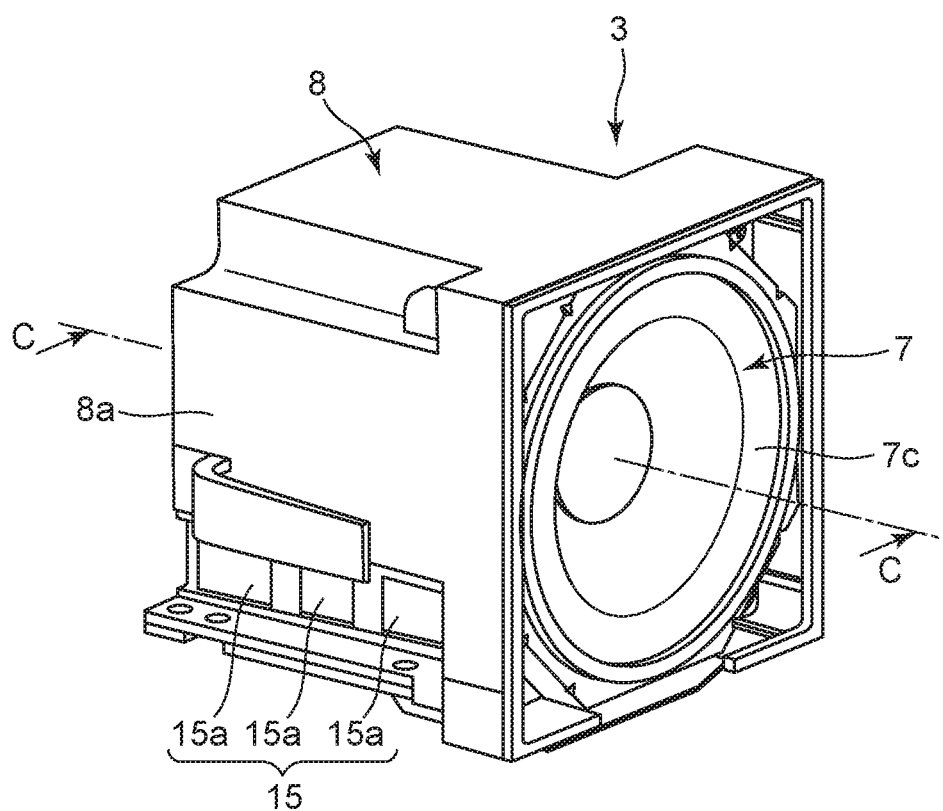
FIG. 5 is an enlarged perspective view of a first modification example of the speaker section shown in FIG. 2.

As a result, the speaker box 8 is structured such that, when air outside the exterior case 1 is taken by the cooling fan 5 from the inlet port 6b of the exterior case 1 to the inside of the flow path section 6, this air taken to the inside of the flow path section 6 in the exterior case 1 passes through the inside of the speaker box 8 so as to be released from the outlet port 6a of the exterior case 1 to the outside, whereby the inside of the speaker box 8 is cooled, as shown in FIG. 1 and FIG. 5.

That is, this speaker box 8 is structured such that air taken to the inside of the exterior case 1 by the cooling fan 5 is taken from the second vent 12 of the speaker box 8 to the inside of the speaker box 8, and released from the first vent 11 of the speaker box 8 to the inside of the exterior case 1, whereby the inside of the speaker box 8 is cooled so as to cool the speaker 7, as shown in FIG. 5.

Also, this speaker box 8 is structured such that, since the first and second vents 11 and 12 are at the positions shifted from the center portion G of the speaker 7, sound leakage from the first and second vents 11 and 12 is small when the speaker 7 generates sounds such as voice or music while air is flowing inside the speaker box 8 from the second vent 12 toward the first vent 11, and a decrease in sound pressure inside the speaker box 8 is reduced, so that the sound pressure is maintained, as shown in FIG. 2 and FIG. 5.

Next, the mechanism of this projection device is described.

When using this projection device, the user arranges the exterior case 1 on a table (not shown), arranges a screen (not shown) in front (left side in FIG. 1) of the projection section 2 in the exterior case 1, and then moves to a position behind (right side in FIG. 1) the exterior case 1 which is a position opposite to that of the projection section 2. In this state, when an image such as video is projected by the projection section 2 onto the screen, the user can view the projected image over the exterior case 1.

In this state, when the speaker 7 of the speaker section 3 is driven to generate a sound such as voice or music, the generated sound is emitted toward the user side through the speaker net 10 of the third side section 1c on the back surface side of the exterior case 1. More specifically, when a sound such as voice or music is to be generated from the speaker section 3, the electromagnet 7a of the speaker 7 is driven to vibrate the diaphragm 7b, whereby a sound such as voice or music is emitted toward the user side in accordance with the vibration of the diaphragm 7b.

Here, the cooling fan 5 of the cooling section 4 is operated and takes air outside the exterior case 1 from the inlet port 6b of the exterior case 1 to the inside of the flow path section 6 in the exterior case 1. This taken air flows through the flow path section 6 to cool the speaker section 3 arranged inside the flow path section 6, and then released by the cooling fan 5 from the release port 6a of the exterior case 1 to the outside of the exterior case 1.

As a result, an increase in temperature inside the speaker box 8 is suppressed by the cooling fan 5 even when the temperature inside the speaker box 8 is gradually increased by the speaker 7 of the speaker unit 3 generating a sound. That is, when air flows through the flow path section 6 by the cooling fan 5, it flows into the inside of the speaker box 8 from the second vent 12 of the speaker box 8 and is released from the first vent 11 of the speaker box 8, so that the inside of the speaker box 8 is cooled. Here, since the first and second vents 11 and 12 each have a slit shape elongated in the lateral direction parallel to the center axis S of the speaker 7, and are opposing each other via the speaker 7, air efficiently flows from the second vent 12 toward the first vent 11 via the inside of the speaker box 8, whereby the inside of the speaker box 8 is favorably cooled.

Also, here, since the first and second vents 11 and 12 each have the slit shape elongated in the lateral direction parallel to the center axis S of the speaker 7 and are at the positions avoiding the areas corresponding to the center portion G of the speaker 7, sound leakage from the first and second vents 11 and 12 is small when the speaker 7 generates a sound such as voice or music.

That is, since the first and second vents 11 and 12 are at the positions avoiding the areas corresponding to the center portion G of the speaker 7, that is, the positions on the lower side located lower than the center portion G of the speaker 7, sound leakage from the first and second vents 11 and 12 due to the sound directivity of the speaker 7, that is, concentric sound directivity centering on the center axis S of the speaker 7 is decreased. Also, a decrease in sound pressure inside the speaker box 8 is reduced to maintain the sound pressure, whereby a sound such as voice or music is favorably emitted.

As described above, the speaker box 8 of the projection device for accommodating the speaker 7 includes the first vent 11 provided in the first side surface section 8a of the speaker box 8 in parallel with the center axis S of the speaker 7 and positioned avoiding an area corresponding to the center portion G of the speaker 7 and the second vent 12 provided in the second side surface section 8b of the speaker box 8 opposing the first side surface section 8a via the speaker 7 and positioned avoiding an area corresponding to the center portion G of the speaker G. As a result, an increase in temperature inside the speaker box 8 can be suppressed, a sound pressure therein can be maintained, and a sound can be favorably emitted.

That is, in the speaker box 8 of the projection device, since the first and second vents 11 and 12 are provided in the first side surface section 8a and the second side surface section 8b of the speaker box 8 opposing each other via the speaker 7, air easily flows through the speaker box 8. Therefore, an increase in temperature inside the speaker box 8 can be reliably and favorably suppressed.

Also, in the speaker box 8 of the projection device, since the first and second vents 11 and 12 are provided avoiding the areas corresponding to the center potion G of the speaker 7, sound leakage from the first and second vents 11 and 12 due to the sound directivity of the speaker 7, that is, concentric sound directivity centering at the center axis S of the speaker 7 can be reduced. As a result, a sound pressure inside the speaker box 8 can be maintained, whereby a sound such as voice or music can be favorably emitted from the speaker 7.

In this embodiment, the first vent 11 and the second vent 12 are provided opposing each other in the first side surface section 8a and the second side surface section 8b of the speaker box 8 opposing via the speaker 7. As a result, air efficiently and smoothly flows through the speaker box 8, whereby an increase in temperature inside the speaker box 8 can be further reliably and favorably suppressed.

Also, the first vent 11 and the second vent 12 are each provided in a slit shape elongated in the direction parallel to the center axis S of the speaker 7. Accordingly, air favorably flows through the speaker box 8, and the leakage of a sound of the speaker 7 from the first vent 11 and the second vent 12 can be favorably reduced. As a result, a sound pressure inside the speaker box 8 can be maintained, whereby a sound from the speaker 7 can be further favorably emitted. That is, the first vent 11 and the second vent 12 are each formed in a slit shape whose length in the lateral direction parallel to the center axis S of the speaker 7 is sufficiently longer than that in the vertical direction orthogonal to the center axis S of the speaker 7. As a result, the leakage of a sound of the speaker 7 from the first vent 11 and the second vent 12 can be reliably and favorably reduced, whereby a sound pressure inside the speaker box 8 can be further maintained.

Also, this speaker box 8 includes the cooling fan 5 to circulate air to the first vent 11 and the second vent 12. This cooling fan 5 causes air to forcibly flow through the speaker box 8, and thereby reliably and favorably cools the inside of the speaker box 8.

That is, in this speaker box 8, air can be taken from the second vent 12 of the speaker box 8 to the inside of the speaker box 8 by the cooling fan 5, and released from the first vent 11 of the speaker box 8. As a result of this structure, air can be reliably and favorably flowed through the speaker box 8, and the inside of the speaker box 8 can be reliably and favorably cooled.

In the above-described first embodiment, the first and second vents 11 and 12 are each provided in a slit shape extending in the lateral direction parallel to the center axis S of the speaker 7, in the first side surface section 8a and the second side surface section 8b of the speaker box 8 opposing each other via the speaker 7. However, the present invention is not limited thereto. For example, a first vent 15 that serves as an outlet port and a second vent 16 that serves as an inlet port may be formed as in a first modification example shown in FIG. 5, FIG. 6A, and FIG. 6B.

Figure 6A:
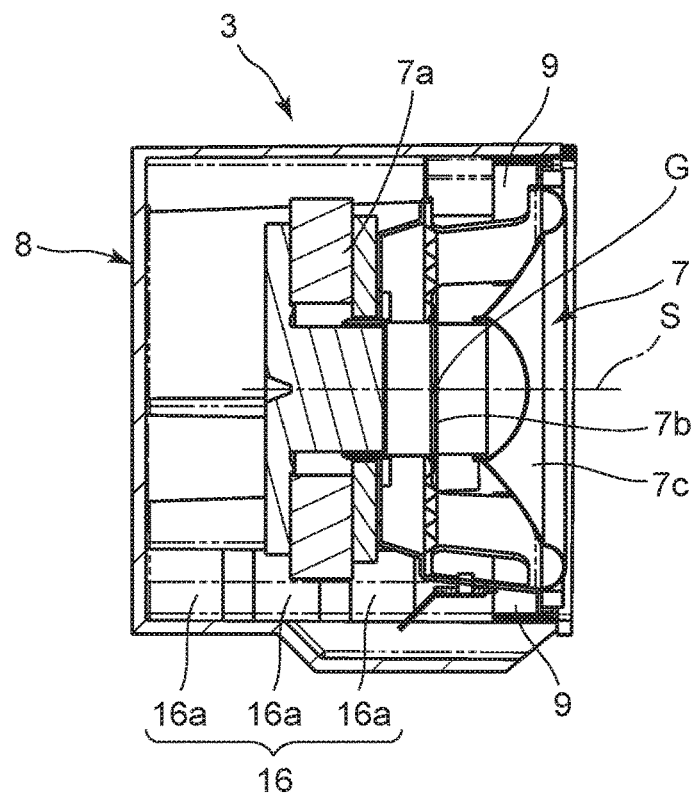
FIG. 6A is side view of the speaker section taken along line C-C in FIG. 5.
Figure 6B:
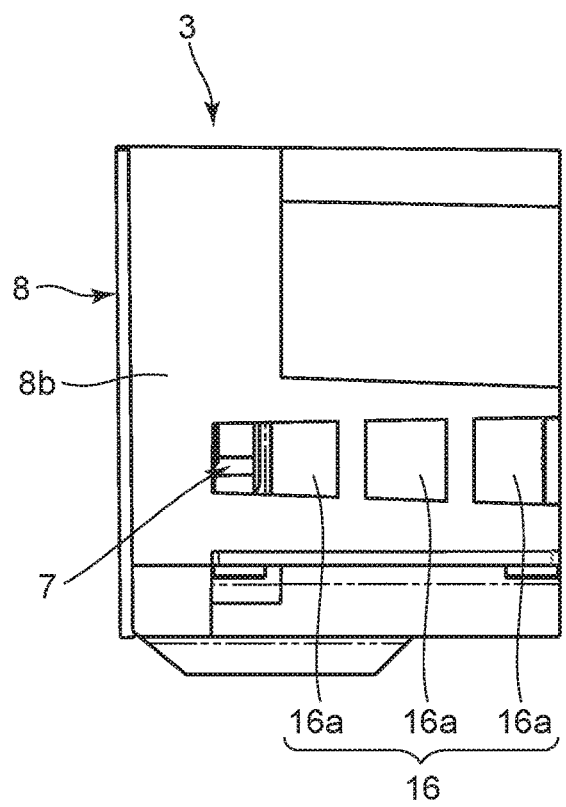
FIG. 6B is a right side view of the speaker section shown in FIG. 5.

More specifically, this first modification example is structured such that the first vent 15 and the second vent 16 have a plurality of holes 15a and 16a, respectively, arranged in the lateral direction parallel to the center axis S of the speaker 7, as shown in FIG. 5, FIG. 6A, and FIG. 6B. In this case as well, the first vent 15 and the second vent 16 are provided in the first side surface section 8a and the second side surface section 8b of the speaker box 8 in a manner to avoid areas corresponding to the center potion G of the speaker 7 and to be opposed to each other via the speaker 7.

Accordingly, in this speaker box 8 as well, by the first vent 15 and the second vent 16, an increase in temperature inside the speaker box 8 can be suppressed and a sound pressure inside the speaker box 8 can be maintained, whereby a sound can be favorably emitted from the speaker 7, as with the first embodiment.

(Second Embodiment)

Next, a second embodiment of the projection device to which the present invention has been applied is described with reference to FIG. 7 to FIG. 9B. Note that sections that are the same as those of the first embodiment shown in FIG. 1 to FIG. 4B are provided with the same reference numerals.

This projection device has the same structure as that of the first embodiment except that a first vent 20 that serves as an outlet port of the speaker box 8 and a second vent 21 that serves as an inlet port thereof are different in structure from those of the first embodiment, as shown in FIG. 7 to FIG. 9B.

More specifically, the first vent 20 is provided in the first side surface section 8a (side surface on the front side in FIG. 7) of the speaker box 8 arranged in parallel with the center axis S of the speaker box 7, and positioned avoiding an area corresponding to the center portion G of the speaker 7, as shown in FIG. 7 to FIG. 9B. Also, the second vent 21 is provided in the second side surface section 8b (side surface on the rear side in FIG. 7) of the speaker box 8 opposing the first side surface section 8a via the speaker 7, and positioned avoiding an area corresponding to the center portion G of the speaker 7.

Here, the first vent 20 and the second vent 21 are each provided at a position avoiding an area corresponding to the center portion G of the speaker 7, such as a position on the rear side (left side portion in FIG. 8B) of the speaker box 8 corresponding to the electromagnet 7a of the speaker 7, as shown in FIG. 7 to FIG. 9B. These first and second vents 20 and 21 have a substantially same size and are provided opposing each other via the speaker 7.

Figure 7:
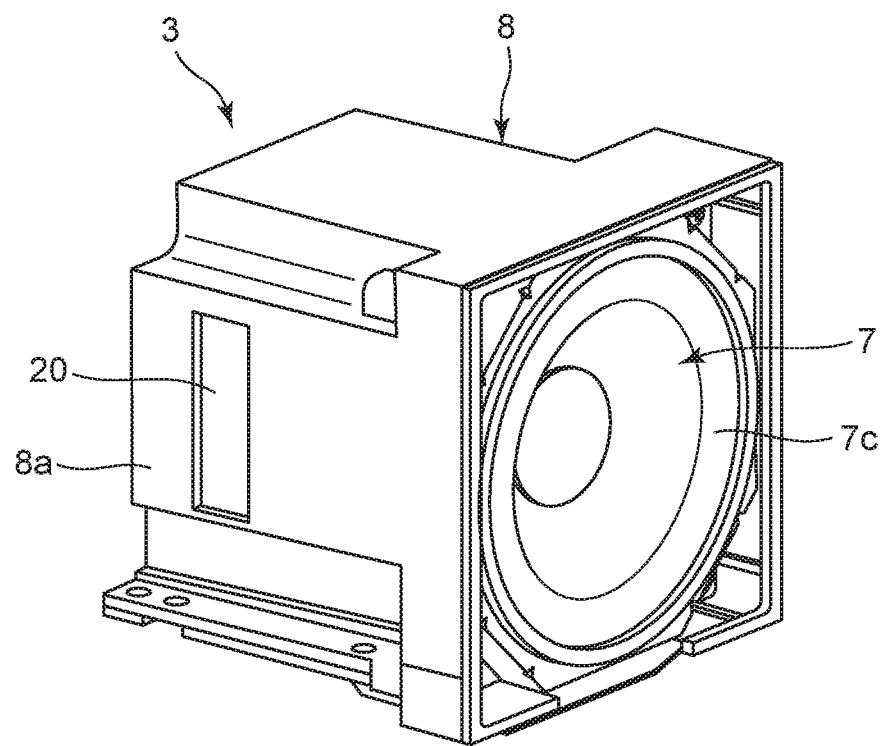
FIG. 7 is an enlarged perspective view of a speaker section in a second embodiment where the present invention has been applied in a projection device.
Figure 8A:
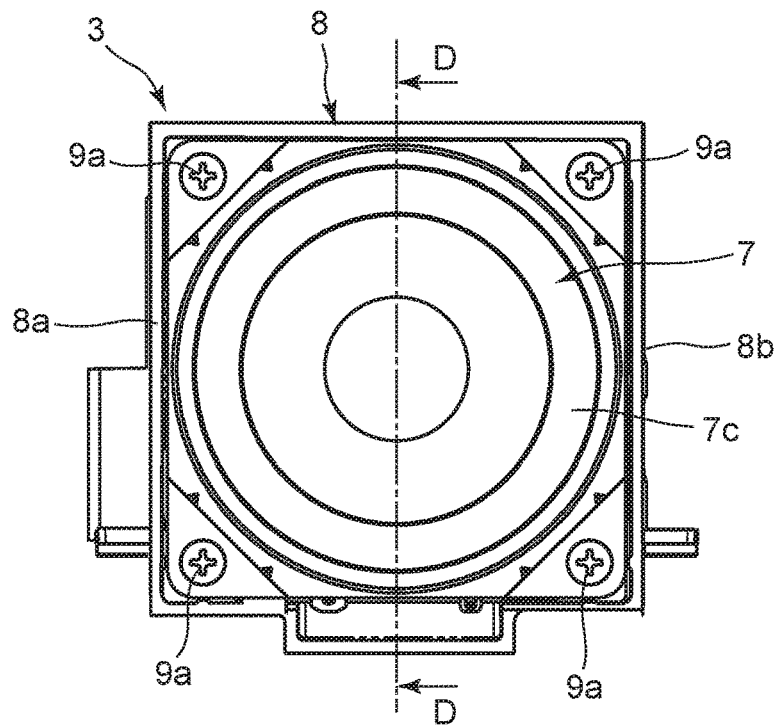
FIG. 8A is a front view of the speaker section shown in FIG. 7.
Figure 8B:
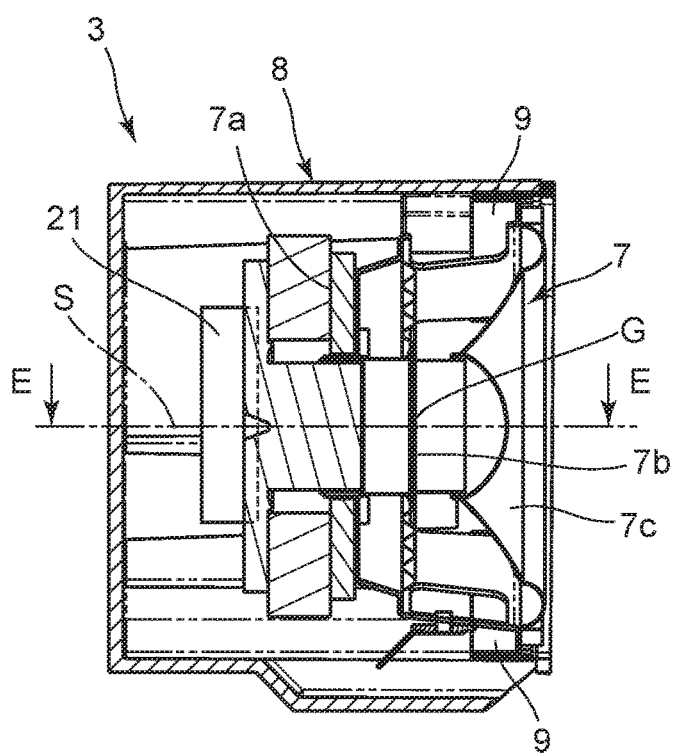
FIG. 8B is a sectional view of the speaker section taken along line D-D in FIG. 8A.
Figure 9A:
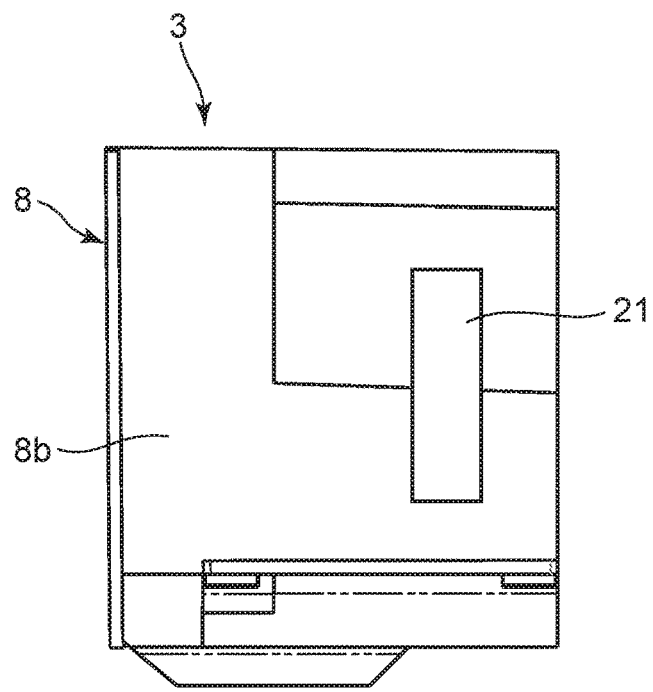
FIG. 9A is a right side view of the speaker section shown in FIG. 7.
Figure 9B:
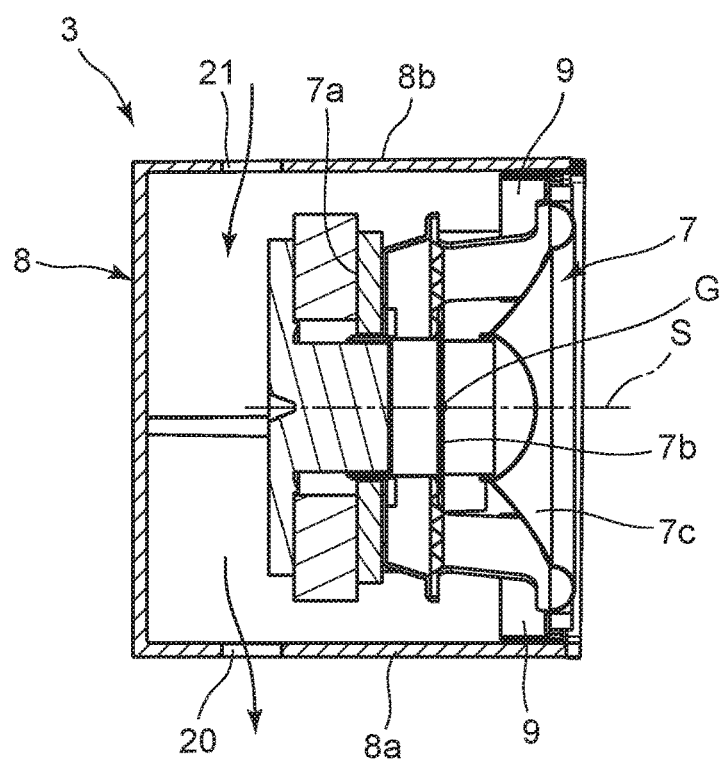
FIG. 9B is a sectional view of the speaker section taken along line E-E in FIG. 8B.

The first vent 20 is provided in the first side surface section 8a and located at a position avoiding an area corresponding to the center portion G of the speaker 7, that is, a position (left side in FIG. 8B) corresponding to an area behind the center portion G of the speaker 7, as shown in FIG. 7, FIG. 9A, and FIG. 9B. That is, this first vent 20 is provided at a position where sound leakage due to the sound directivity of the speaker 7, that is, concentric sound directivity centering on the center axis S of the speaker 7 is decreased.

Similarly, the second vent 21 is provided in the second side surface section 8b and located at a position avoiding an area corresponding to the center portion G of the speaker 7, that is, a position (left side in FIG. 8B) corresponding to an area behind the center portion G of the speaker 7, as shown in FIG. 7, FIG. 9A, and FIG. 9B. That is, this second vent 21 is also provided at a position where sound leakage due to the sound directivity of the speaker 7, that is, concentric sound directivity centering on the center axis S of the speaker 7 is decreased.

These first vent 20 and second vent 21 are each provided in a slit shape elongated in the vertical direction orthogonal to the center axis S of the speaker 7. That is, these first and second vents 20 and 21 are formed such that its length in the vertical direction orthogonal to the center axis S of the speaker 7 is sufficiently longer than that in the lateral direction parallel to the center axis S of the speaker 7, as shown in FIG. 7 to FIG. 9B.

That is, these first vent 20 and second vent 21 are formed so as to reduce a decrease in the sound pressure of the speaker 7 inside the speaker box 8 and to ensure ventilation inside the speaker box 8 so that an increase in temperature inside the speaker box 8 is suppressed, as shown in FIG. 7 to FIG. 9B.

As a result, as in the case of the first embodiment, the speaker box 8 is structured such that, when air outside the exterior case 1 is taken by the cooling fan 5 from the inlet port 6b of the exterior case 1 to the inside of the flow path section 6, this air taken to the inside of the flow path section 6 in the exterior case 1 passes through the speaker box 8 so as to be released from the outlet port 6a of the exterior case 1 to the outside, whereby the inside of the speaker box 8 is cooled, as shown in FIG. 7 to FIG. 9B.

That is, as in the case of the first embodiment, this speaker box 8 is structured such that air taken to the inside of the exterior case 1 by the cooling fan 5 is taken from the second vent 21 of the speaker box 8 to the inside of the speaker box 8, and released from the first vent 20 of the speaker box 8 to the inside of the flow path section 6 in the exterior case 1, whereby the inside of the speaker box 8 is cooled so as to cool the speaker 7, as shown in FIG. 7 to FIG. 9B.

Also, this speaker box 8 is structured such that, since the first and second vents 20 and 21 are at the positions shifted from the center portion G of the speaker 7, sound leakage from the first and second vents 20 and 21 is small when the speaker 7 generates sounds such as voice or music while air is flowing inside the speaker box 8 from the second vent 21 toward the first vent 20, and a decrease in sound pressure inside the speaker box 8 is reduced, so that the sound pressure is maintained, as shown in FIG. 7 to FIG. 9B.

Next, the mechanism of this projection device is described.

As in the case of the first embodiment, when using this projection device, the user arranges the exterior case 1 on a table (not shown). In this state, when an image such as video is projected by the projection section 2 onto a screen (not shown), the user can view the projected image over the exterior case 1. Also, in this state, when the speaker 7 of the speaker section 3 generates a sound such as voice or music, the generated sound is emitted toward the user side through the speaker net 10 of the third side section 1c of the exterior case 1.

Here, the cooling fan 5 of the cooling section 4 is operated and takes air outside the exterior case 1 from the inlet port 6b of the exterior case 1 to the inside of the flow path section 6 in the exterior case 1, as with the first embodiment. This taken air flows through the flow path section 6 to cool the speaker section 3 arranged inside the flow path section 6, and then released by the cooling fan 5 from the release port 6a of the exterior case 1 to the outside of the exterior case 1.

As a result, an increase in temperature inside the speaker box 8 is suppressed by the cooling fan 5 even when the temperature inside the speaker box 8 is gradually increased by the speaker 7 of the speaker unit 3 generating a sound. That is, when air flows through the flow path section 6 by the cooling fan 5, it flows into the inside of the speaker box 8 from the second vent 21 of the speaker box 8 and is released from the first vent 20 of the speaker box 8, so that the inside of the speaker box 8 is cooled.

Here, since the first and second vents 20 and 21 each have a slit shape elongated in the vertical direction orthogonal to the center axis S of the speaker 7, and are opposing each other via the speaker 7, air efficiently flows from the second vent 21 toward the first vent 20 via the inside of the speaker box 8, whereby the inside of the speaker box 8 is favorably cooled.

Also, here, since the first and second vents 20 and 21 each have the slit shape elongated in the vertical direction orthogonal to the center axis S of the speaker 7 and are at the positions avoiding the areas corresponding to the center portion G of the speaker 7, that is, the positions corresponding to the area behind the center portion G of the speaker, sound leakage from the first and second vents 20 and 21 is small when the speaker 7 generates a sound such as voice or music.

That is, since the first and second vents 20 and 21 are at the positions avoiding the areas corresponding to the center portion G of the speaker 7, that is, the positions corresponding to the area behind the center portion G of the speaker 7, sound leakage from the first and second vents 20 and 21 due to the sound directivity of the speaker 7, that is, concentric sound directivity centering on the center axis S of the speaker 7 is decreased. Also, a decrease in sound pressure inside the speaker box 8 is reduced to maintain the sound pressure, whereby a sound such as voice or music is favorably emitted.

The first vent (outlet port) 20 is provided at a position shifted from the normal axis of the first side surface section 8a connecting the center portion G of the speaker 7 and the first side surface section 8a. The second vent (inlet port) 21 is provided at a position shifted from the normal axis of the second side surface section 8b connecting the center portion G of the speaker 7 and the second side surface section 8b.

As described above, the speaker box 8 of the projection device for accommodating the speaker 7 includes the first vent 20 provided in the first side surface section 8a of the speaker box 8 in parallel with the center axis S of the speaker 7 and positioned avoiding an area corresponding to the center portion G of the speaker 7, and the second vent 21 provided in the second side surface section 8b of the speaker box 8 opposing the first side surface section 8a via the speaker 7 and positioned avoiding an area corresponding to the center portion G of the speaker G. As a result, an increase in temperature inside the speaker box 8 can be suppressed, a sound pressure therein can be maintained, and a sound can be favorably emitted, as with the first embodiment.

That is, in the speaker box 8 of the projection device, since the first and second vents 20 and 21 are provided in the first side surface section 8a of the second side surface section 8b of the speaker box 8 opposing each other via the speaker 7, air easily flows through the speaker box 8. Therefore, an increase in temperature inside the speaker box 8 can be reliably and favorably suppressed, as with the first embodiment.

Also, in the speaker box 8 of the projection device, since the first vent 20 and the second vent 21 are provided avoiding the areas corresponding to the center potion G of the speaker 7, sound leakage from the first and second vents 20 and 21 due to the sound directivity of the speaker 7, that is, concentric sound directivity centering on the center axis S of the speaker 7 can be reduced, as with the first embodiment. As a result, a sound pressure inside the speaker box 8 can be maintained, whereby a sound such as voice or music can be favorably emitted from the speaker 7.

In this embodiment, the first vent 20 and the second vent 21 are provided opposing each other in the first side surface section 8a and the second side surface section 8b of the speaker box 8 opposing via the speaker 7. As a result, air efficiently and smoothly flows through the speaker box 8, whereby an increase in temperature inside the speaker box 8 can be further reliably and favorably suppressed, as with the first embodiment.

Also, the first vent 20 and the second vent 21 are each provided in a slit shape elongated in the vertical direction orthogonal to the center axis S of the speaker 7. Accordingly, air favorably flows through the speaker box 8, and the leakage of a sound of the speaker 7 from the first vent 20 and the second vent 21 can be favorably reduced. As a result, a sound pressure inside the speaker box 8 can be maintained, whereby a sound from the speaker 7 can be further favorably emitted.

That is, the first vent 20 and the second vent 21 are each formed in a slit shape whose length in the vertical direction orthogonal to the center axis S of the speaker 7 is sufficiently longer than that in the lateral direction parallel to the center axis S of the speaker 7. As a result, the leakage of a sound of the speaker 7 from the first vent 20 and the second vent 21 can be reliably and favorably reduced, whereby a sound pressure inside the speaker box 8 can be further maintained.

Also, this speaker box 8 includes the cooling fan 5 to circulate air to the first vent 20 and the second vent 21. This cooling fan 5 causes air to forcibly flow through the speaker box 8, and thereby reliably and favorably cools the inside of the speaker box 8.

That is, in this speaker box 8, air can be taken from the second vent 21 of the speaker box 8 to the inside of the speaker box 8 by the cooling fan 5, and released from the first vent 20 of the speaker box 8. As a result of this structure, air can be reliably and favorably flowed through the speaker box 8, and the inside of the speaker box 8 can be reliably and favorably cooled.

In the above-described second embodiment, the first and second vents 20 and 21 are each provided in a slit shape extending in the vertical direction orthogonal to the center axis S of the speaker 7, in the first side surface section 8a and the second side surface section 8b of the speaker box 8 opposing each other via the speaker 7. However, the present invention is not limited thereto. For example, a first vent 25 that serves as an outlet port and a second vent 26 that serves as an inlet port may be formed as in a second modification example shown in FIG. 10, FIG. 11A, and FIG. 11B.

Figure 10:
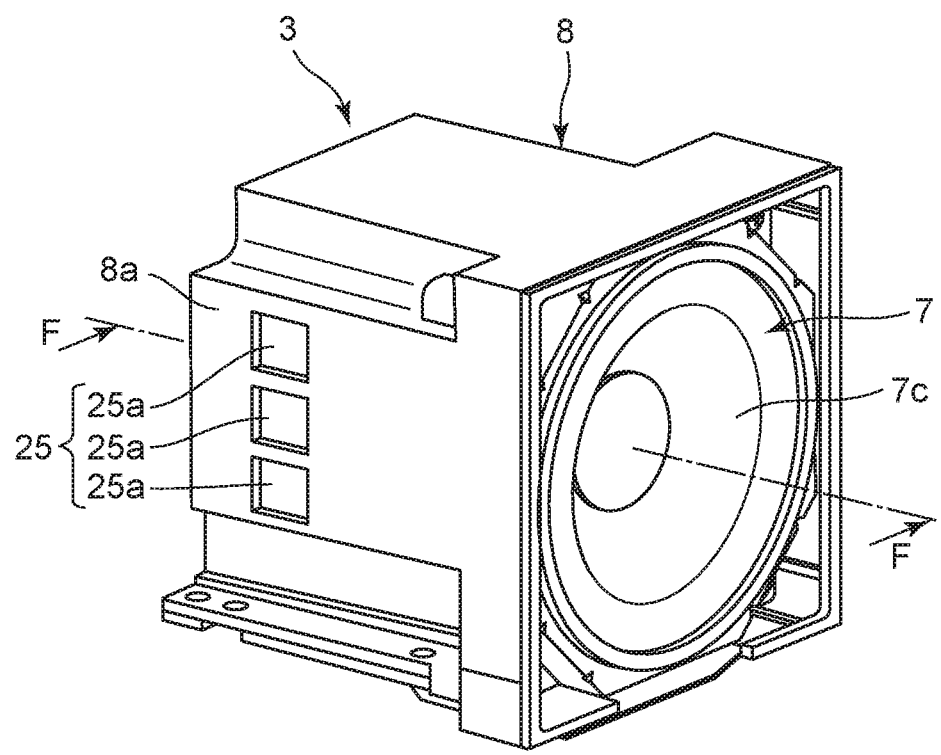
FIG. 10 is an enlarged perspective view of a second modification example of the speaker section shown in FIG. 7.
Figure 11A:
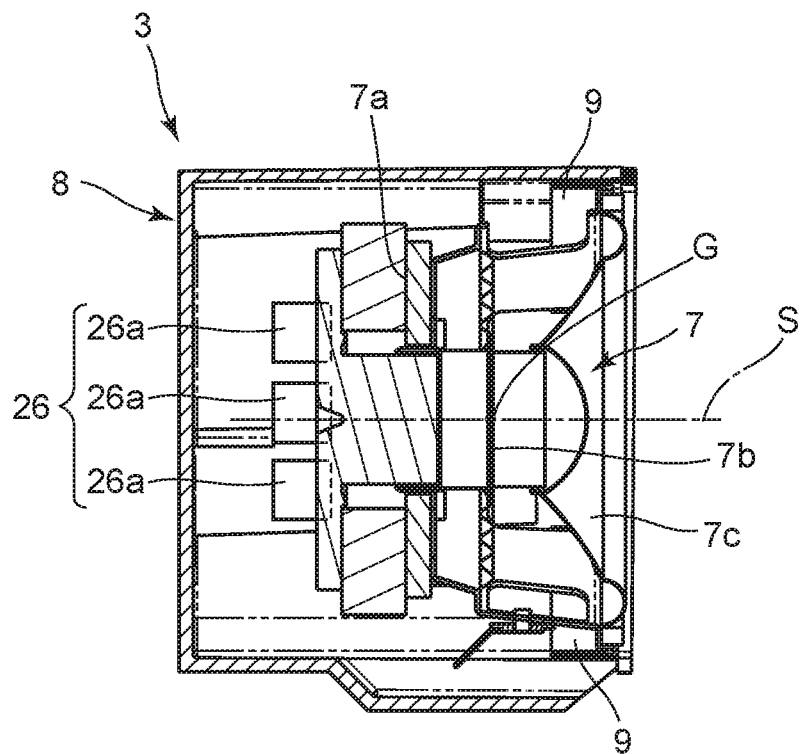
FIG. 11A is a sectional view of the speaker section taken along line F-F in FIG. 10.
Figure 11B:
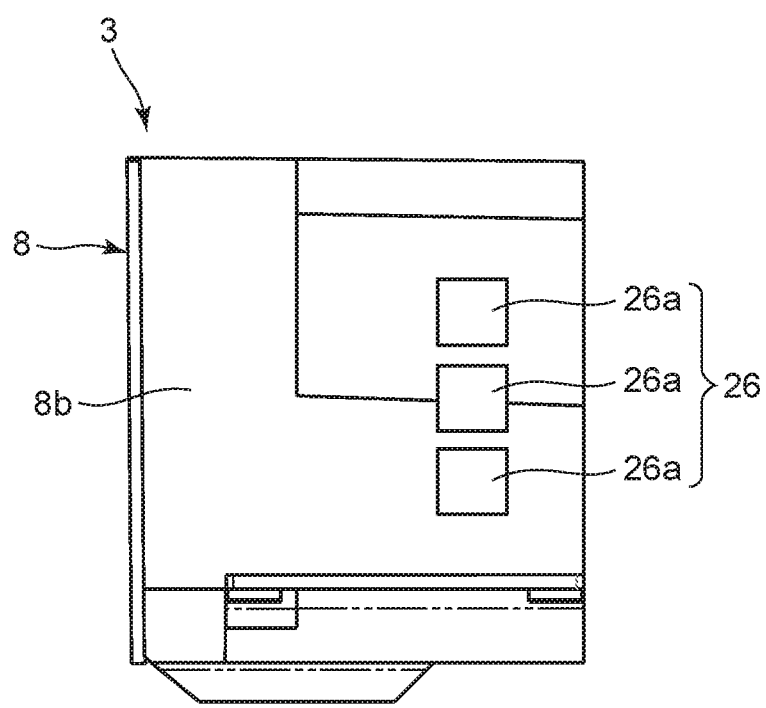
FIG. 11B is a right side view of the speaker section shown in FIG. 10.

More specifically, this second modification example is structured such that the first vent 25 and the second vent 26 have a plurality of holes 25a and 26a, respectively, arranged in the vertical direction orthogonal to the center axis S of the speaker 7, as shown in FIG. 10, FIG. 11A, and FIG. 11B. In this case as well, the first vent 25 and the second vent 26 are provided in the first side surface section 8a and the second side surface section 8b of the speaker box 8 in a manner to avoid areas corresponding to the center potion G of the speaker 7 and to be opposed to each other via the speaker 7.

Accordingly, in this speaker box 8 as well, by the first vent 25 and the second vent 26, an increase in temperature inside the speaker box 8 can be suppressed and a sound pressure inside the speaker box 8 can be maintained, whereby a sound can be favorably emitted from the speaker 7, as with the second embodiment.

Figure 12:
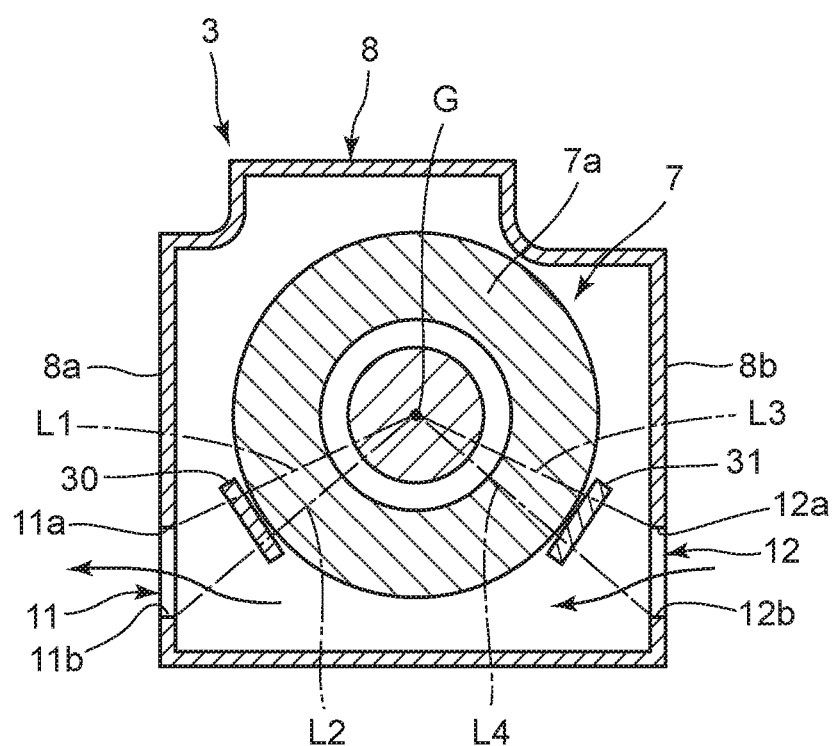
FIG. 12 is a sectional view showing the main section in a third modification example of the speaker section in the projection device where the present invention has been applied.

Note that the present invention is not limited to the first and second embodiments and the first and second modification examples described above. For example, a structure may be adopted which includes first and second partitioning members 30 and 31, as in a third modification example shown in FIG. 12. More specifically, the first partitioning member 30 of the third modification example in FIG. 12 is provided around the outer periphery of the speaker 7 in substantially parallel with its tangent line and positioned corresponding to the first vent 11. The second partitioning member 31 is provided around the outer periphery of the speaker 7 in substantially parallel with its tangent line and positioned corresponding to the second vent 12.

That is, the first partitioning member 30 is provided on a line radially connecting the center portion G of the speaker 7 and the first vent 11 (between a radial line L1 and a radial line L2) and the second partitioning member 31 is provided on a line radially connecting the center portion G of the speaker 7 and the second vent 12 (between a radial line L3 and a radial line L4).

Here, the first partitioning member 30 is formed in a plate shape and arranged close to the outer periphery of the speaker 7, as shown in FIG. 12. This first partitioning member 30 is formed such that its length in a tangential direction of the speaker 7 is slightly longer than a length between the radial lines L1 and L2 radially connecting the center axis S of the speaker 7 and inner ends 11a and lib of the first vent 11.

Consequently, the first partitioning member 30 is provided at a position away from the first vent 11 without blocking the first vent 11. As a result, the first partitioning member 30 is structured such that a sound from the speaker 7 is not directly leaked from the first vent 11 and air inside the speaker box 8 flows along the first partitioning member 30.

As with the first partitioning member 30, the second partitioning member 31 is formed in a plate shape and arranged close to the outer periphery of the speaker 7, as shown in FIG. 12. This second partitioning member 31 is also formed such that its length in a tangential direction of the speaker 7 is slightly longer than a length between the radial lines L3 and L4 radially connecting the center axis S of the speaker 7 and inner ends 12a and 12b of the second vent 12.

Consequently, the second partitioning member 31 is provided at a position away from the second vent 12 without blocking the second vent 12. As a result, the second partitioning member 31 is structured such that a sound from the speaker 7 is not directly leaked from the second vent 12 and air inside the speaker box 8 flows along the second partitioning member 31.

According to this speaker box 8, when flowing through the speaker box 8 by the first vent 11 and the second vent 12, air flows along the first partitioning member 30 and the second partitioning member 31. That is, the air flow is not blocked by the first partitioning member 30 and the second partitioning member 31. As a result, the air favorably flows through the speaker box 8, whereby an increase in temperature inside the speaker box 8 is reliably and favorably suppressed, as with the first embodiment.

Also, in this speaker box 8, the first partitioning member 30 is provided around the outer periphery of the speaker 7 in substantially parallel with its tangent line, and positioned corresponding to the first vent 11. Accordingly, by the first partitioning member 30, a sound from the speaker 7 is prevented from being directly leaked from the first vent 11. As a result, a decrease in sound pressure inside the speaker box 8 can be reliably prevented, whereby the sound pressure inside the speaker box 8 can be further maintained and the sound from the speaker 7 can be further favorably emitted.

Similarly, in this speaker box 8, the second partitioning member 31 is provided around the outer periphery of the speaker in substantially parallel with its tangent line, and positioned corresponding to the second vent 12. Accordingly, by the second partitioning member 31, a sound from the speaker 7 is prevented from being directly leaked from the second vent 12. As a result, a decrease in sound pressure inside the speaker box 8 can be reliably prevented, whereby the sound pressure inside the speaker box 8 can be further maintained and the sound from the speaker 7 can be further favorably emitted.

Also, the present invention is not limited to the first and second embodiments and the first to third modification examples described above. For example, a structure may be adopted which includes first and second partitioning members 32 and 33 as in a fourth modification example shown in FIG. 13. More specifically, the first partitioning member 32 of the fourth modification example in FIG. 13 is provided around the outer periphery of the speaker 7 in substantially parallel with its tangent line, and positioned corresponding to the first vent 11.

Also, the second partitioning member 33 is provided around the outer periphery of the speaker 7 in substantially parallel with its tangent line, and positioned corresponding to the second vent 12. That is, the first partitioning member 32 is provided on a line radially connecting the center axis S of the speaker 7 and the first vent 11 and the second partitioning member 33 is provided on a line radially connecting the center axis S of the speaker 7 and the second vent 12.

Figure 13:
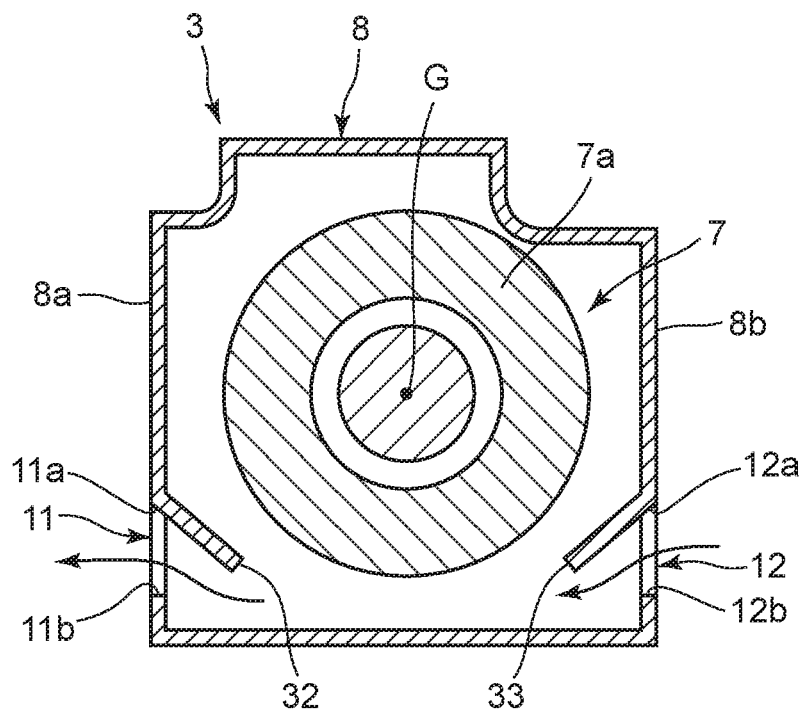
FIG. 13 is a sectional view showing the main section in a fourth modification example of the speaker section in the projection device where the present invention has been applied.

Here, the first partitioning member 32 is formed in a plate shape, and medially arranged on the first vent 11, as shown in FIG. 13. This first partitioning member 32 has a size substantially equal to that of the first vent 11, of which one end is provided on one inner end 11a of the first vent 11 and the other end is provided away from the other inner end 11b of the first vent 11 toward the inside of the speaker box 8.

Consequently, the first partitioning member 32 is structured such that the first vent 11 is not blocked thereby and air flows through the first vent 11. As a result, the first partitioning member 32 is structured such that a sound from the speaker 7 is not directly leaked from the first vent 11 and air inside the speaker box 8 flows along the first partitioning member 32.

As with the first partitioning member 32, the second partitioning member 33 is formed in a plate shape, and medially arranged on the second vent 12, as shown in FIG. 13. This second partitioning member 33 has a size substantially equal to that of the second vent 12, of which one end is provided on one inner end 12a of the second vent 12 and the other end is provided away from the other inner end 12b of the second vent 12 toward the inside of the speaker box 8.

Consequently, the second partitioning member 33 is structured such that the second vent 12 is not blocked thereby and air flows through the second vent 12. As a result, the second partitioning member 33 is structured such that a sound from the speaker 7 is not directly leaked from the second vent 12 and air inside the speaker box 8 flows along the second partitioning member 33.

According to this speaker box 8, when flowing through the speaker box 8 by the first vent 11 and the second vent 12, air flows along the first partitioning member 32 and the second partitioning member 33, as with the third modification example. That is, the air flow is not blocked by the first partitioning member 32 and the second partitioning member 33. As a result, the air favorably flows through the speaker box 8, whereby an increase in temperature inside the speaker box 8 is reliably and favorably suppressed, as with the first embodiment.

Also, in this speaker box 8, the first partitioning member 32 is provided on and corresponding to one inner end 11a of the first vent 11 and located around the outer periphery of the speaker 7 in substantially parallel with its tangent line. Accordingly, by the first partitioning member 32, a sound from the speaker 7 is prevented from being directly leaked from the first vent 11. As a result, a decrease in sound pressure inside the speaker box 8 can be reliably prevented, whereby the sound pressure inside the speaker box 8 can be further maintained and the sound from the speaker 7 can be further favorably emitted.

Similarly, in this speaker box 8, the second partitioning member 33 is provided on and corresponding to one inner end 12a of the second vent 12 and located around the outer periphery of the speaker 7 in substantially parallel with its tangent line. Accordingly, by the second partitioning member 33, a sound from the speaker 7 is prevented from being directly leaked from the second vent 12. As a result, a decrease in sound pressure inside the speaker box 8 can be reliably prevented, whereby the sound pressure inside the speaker box 8 can be further maintained and the sound from the speaker 7 can be further favorably emitted.

In the third and fourth modification examples described above, the first and second partitioning members 30 to 33 are provided corresponding to the first and second vents 11 and 12 provided in parallel with the center axis S of the speaker 7. However, the present invention is not limited thereto, and they may be applied in the speaker box 8 having the first vent 15, 20 or 25 and the second vent 16, 21 or 26 of the second embodiment and the first and second modification examples.

Also, in the first and second embodiments and the first to fourth modification examples described above, the first vent 11, 15, 20 or 25 and the second vent 12, 16, 21 or 26 are provided opposing each other in the first side surface section 8a and the second side surface section 8b of the speaker box 8 opposing each other via the speaker 7. However, in the present invention, the first vent 11, 15, 20 or 25 and the second vent 12, 16, 21 or 26 are not necessarily required to be provided opposing each other in the first side surface section 8a and the second side surface section 8b of the speaker box 8, and may be provided at positions shifted from each other.

Moreover, in the first and second embodiments and first to fourth modification examples described above, the present invention has been applied in a projection device. However, the present invention is not necessarily required to be applied in a projection device and can be applied to, for example, an electronic device having a speaker such as an audio device.

While the present invention has been described with reference to the preferred embodiments, it is intended that the invention be not limited by any of the details of the description therein but includes all the embodiments which fall within the scope of the appended claims.

What is claimed is:

1. A speaker box for accommodating a speaker, comprising:
   an outlet port provided avoiding an area corresponding to a center portion of the speaker, in a first side surface section of the speaker box which is parallel to a center axis of the speaker; and
   an inlet port provided avoiding an area corresponding to the center portion of the speaker, in a second side surface section of the speaker box which is opposed to the first side surface section via the speaker,
   wherein a partitioning member is formed in a plate shape and provided around an outer periphery of the speaker, on a line radially connecting the center portion of the speaker and the outlet port or a line radially connecting the center portion of the speaker and the inlet port.

2. The speaker box according to claim 1, wherein the outlet port is provided at a position shifted from a normal axis of the first side surface section connecting the center portion of the speaker and the first side surface section, and
   wherein the inlet port is provided at a position shifted from a normal axis of the second side surface section connecting the center portion of the speaker and the second side surface section.

3. The speaker box according to claim 1, wherein the outlet port and the inlet port are provided opposing each other via the speaker.

4. The speaker box according to claim 2, wherein the outlet port and the inlet port are provided opposing each other via the speaker.

5. The speaker box according to claim 1, wherein the outlet port and the inlet port are each provided in a slit shape in a direction parallel to the center axis of the speaker.

6. The speaker box according to claim 2, wherein the outlet port and the inlet port are each provided in a slit shape in a direction parallel to the center axis of the speaker.

7. The speaker box according to claim 3, wherein the outlet port and the inlet port are each provided in a slit shape in a direction parallel to the center axis of the speaker.

8. The speaker box according to claim 4, wherein the outlet port and the inlet port are each provided in a slit shape in a direction parallel to the center axis of the speaker.

9. The speaker box according to claim 1, wherein the outlet port and the inlet port each have a plurality of holes arranged in a direction parallel to the center axis of the speaker.

10. The speaker box according to claim 2, wherein the outlet port and the inlet port each have a plurality of holes arranged in a direction parallel to the center axis of the speaker.

11. The speaker box according to claim 3, wherein the outlet port and the inlet port each have a plurality of holes arranged in a direction parallel to the center axis of the speaker.

12. The speaker box according to claim 4, wherein the outlet port and the inlet port each have a plurality of holes arranged in a direction parallel to the center axis of the speaker.

13. The speaker box according to claim 1, wherein the outlet port and the inlet port are each provided in a slit shape in a direction orthogonal to the center axis of the speaker or each have a plurality of holes arranged in the direction orthogonal to the center axis of the speaker.

14. The speaker box according to claim 2, wherein the outlet port and the inlet port are each provided in a slit shape in a direction orthogonal to the center axis of the speaker or each have a plurality of holes arranged in the direction orthogonal to the center axis of the speaker.

15. The speaker box according to claim 3, wherein the outlet port and the inlet port are each provided in a slit shape in a direction orthogonal to the center axis of the speaker or each have a plurality of holes arranged in the direction orthogonal to the center axis of the speaker.

16. The speaker box according to claim 4, wherein the outlet port and the inlet port are each provided in a slit shape in a direction orthogonal to the center axis of the speaker or each have a plurality of holes arranged in the direction orthogonal to the center axis of the speaker.

17. The speaker box according to claim 1, further comprising: a cooling fan for circulating air to the outlet port and the inlet port.

18. The speaker box according to claim 1, wherein the speaker includes an electromagnet, a diaphragm and a cone, and wherein a position of the center portion of the speaker coincides with a point of intersection of the diaphragm of the speaker and the center axis of the speaker.

19. The speaker box according to claim 1, wherein two partitioning members are provided around an outer periphery of the speaker in substantially parallel with a tangent line of the outer periphery, on a line radially connecting the center portion of the speaker and the outlet port, and a line radially connecting the center portion of the speaker and the inlet port, respectively.

20. A projection device comprising:
the speaker box according to claim 1; and
a projection section which projects an image.

* * * * *